United States Patent [19]
Fujii et al.

[11] 3,984,869
[45] Oct. 5, 1976

[54] AUTOMATIC PROGRAM HEAD POSITIONING AND TAPE FEED CONTROL FOR TAPE DECKS

[75] Inventors: Masaru Fujii; Tatsuhiro Yasunaga; Yoshimasa Okada, all of Higashihiroshima, Japan

[73] Assignee: Sharp Kabushiki Kaisha, Osaka, Japan

[22] Filed: Mar. 28, 1975

[21] Appl. No.: 562,981

[30] Foreign Application Priority Data
Mar. 28, 1974 Japan.............................. 49-60040
Apr. 3, 1974 Japan.............................. 49-38643

[52] U.S. Cl. ................. 360/73; 179/100.1 VC; 360/72; 360/78
[51] Int. Cl.² ................. G11B 15/18; G11B 15/44; G11B 27/22
[58] Field of Search ................. 360/73, 71, 72, 75, 360/78, 106; 179/100.1 VC, 100.1 PS, 100.1 TC

[56] References Cited
UNITED STATES PATENTS

| 3,166,328 | 1/1965 | Roberts | 360/73 |
| 3,505,485 | 4/1970 | Andrews | 360/73 |
| 3,602,650 | 8/1971 | Ban | 179/100.1 VC |
| 3,665,117 | 5/1972 | Staar | 179/100.1 VC |
| 3,711,657 | 1/1973 | Niioka et al. | 360/71 |
| 3,721,774 | 3/1973 | Yonemoto et al. | 179/100.1 VC |
| 3,735,054 | 5/1973 | Poshimura | 179/100.1 VC |

Primary Examiner—Alfred H. Eddleman
Attorney, Agent, or Firm—Steward and Kolasch, Ltd.

[57] ABSTRACT

An automatic program advance switch is provided for advancing or skipping a recorded passage which is about to be played and going on to the next passage. The tape is driven at a fast speed and a reproduction signal from a playback head is muted with the use of a squelch circuit upon depession of the automatic program advance switch. The tape drive is returned to its normal operating speed when a silence between recorded passages on the tape is detected during the fast movement of the tape. The tape speed control is achieved by varying the revolution velocity of a motor for driving the tape.

8 Claims, 6 Drawing Figures

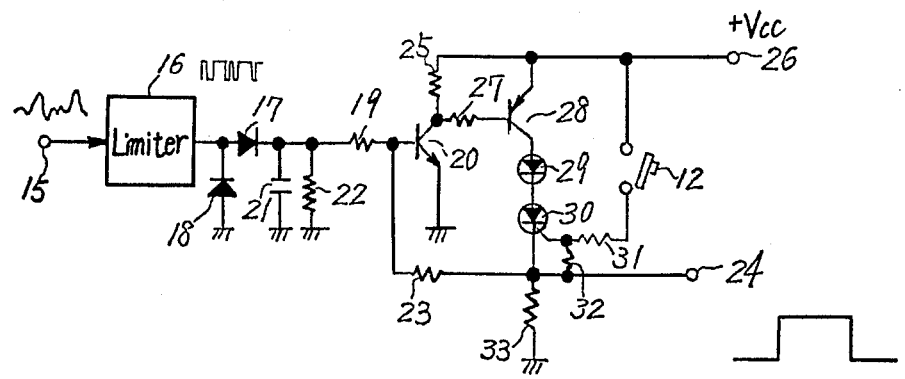
FIG. 3 (Recorded Passage Detection Circuit -7-)
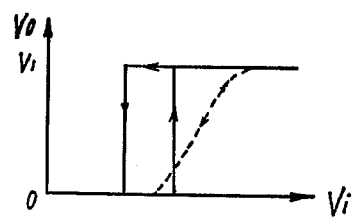
FIG. 4

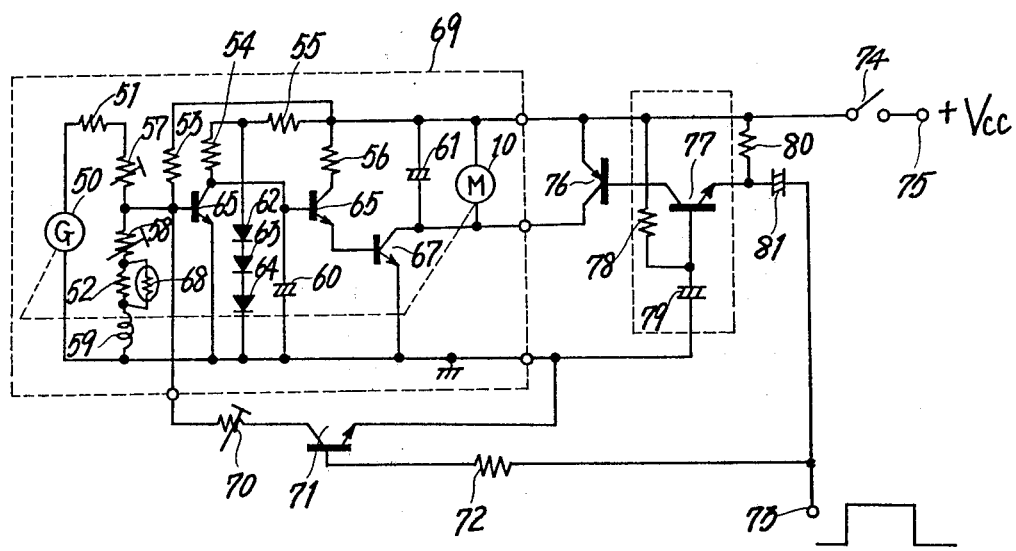
FIG. 5 (Motor Control -9-)
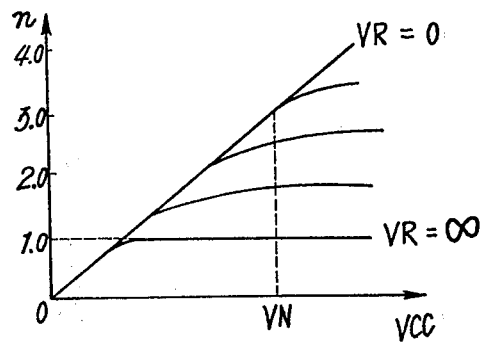
FIG. 6

AUTOMATIC PROGRAM HEAD POSITIONING AND TAPE FEED CONTROL FOR TAPE DECKS

BACKGROUND AND SUMMARY OF THE INVENTION

The present invention relates to an automatic program head positioning system for tape decks for advancing or skipping a recorded passage which is about to be played and going on to the next passage.

The program head positioning system responsive to a silence between recorded passages on the tape during a fast movement of the tape has been proposed, for example, the U.S. Pat. No. 3,602,650, Itsuki Ban "APPARATUS FOR SELECTIVELY FEEDING AN ENDLESS TAPE AT NORMAL OR FAST FEED AND FOR AUTOMATICALLY CHANGING FROM FAST FEED TO NORMAL FEED", issued on Aug. 31, 1971, and the U.S. Pat. No. 3,665,117, Theophiel Clement Jozef Lodewijk Staar "TAPE CARTRIDGE APPARATUS INCLUDING A SILENCE RESPONSIVE POSITIONING CONTROL," issued on May 23, 1972.

The program head positioning system of the prior art comprises a sensing head in addition to a record/playback head and the sensing head is in physical contact with the tape under fast forward or rewind mode. The tape speed selection between the fast movement and normal operating modes is mechanically controlled with the use of idler wheels. The system is unavoidably complicated since the sensing head, the circuit associated with the sensing head and the additional idler wheel are necessary.

Accordingly, an object of the present invention is to provide an automatic program head positioning system exactly positioning a head to a passage with a simple construction.

Another object of the present invention is to provide a tape speed control system wherein the revolution velocity of a motor for driving the tape is electrically controlled.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to the present invention, there is provided an automatic program advance switch for advancing or skipping a recorded passage which is about to be played and going on to the next passage. The tape is driven at a fast speed upon depression of the automatic program advance swich, and a playback head is kept in physical contact with the tape under such a fast movement mode. A reproduction signal from the playback head is muted with the use of a squelch circuit under the fast movement mode. The tape drive is returned to its normal operating speed when a silence between recorded passages on the tape is detected by a recorded passage detection circuit associated with the playback head during the fast movement of the tape. The tape speed control can be provided by varying the revolution velocity of a motor for driving the tape.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 3 is a circuit diagram of the recorded passage detection circuit shown in FIG. 1;

FIG. 4 is a graph of a waveform for the purpose of explanation of the operation of the recorded passage detection circuit of FIG. 3;

FIG. 5 is a circuit diagram of the motor control shown in FIG. 1; and

FIG. 6 is a graph showing a control mode of a motor controlled by the motor control of FIG. 5.

DESCRIPTION OF THE PREFERRED EMBODIMENTS

Figure 1:
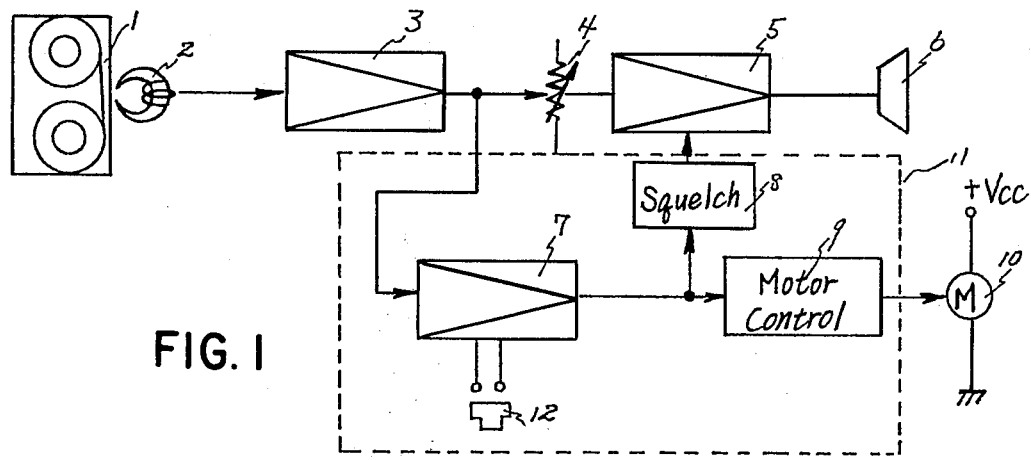
FIG. 1 is a schematic circuit diagram of an automatic program head positioning system of the present invention including a recorded passage detection circuit and a motor control.
Figure 2:
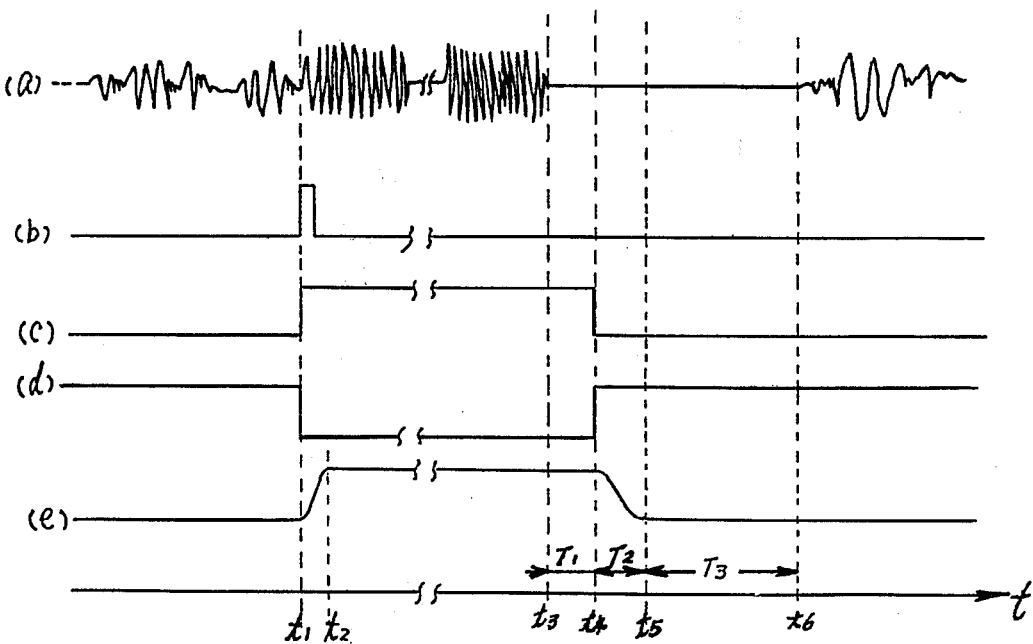
FIGS. 2(a) through 2(e) are time charts for the purpose of explanation of the operation mode of the automatic program head positioning system of FIG. 1.

Referring now to FIG. 1, there is illustrated an automatic program head positioning system of the present invention. A playback head 2 is in physical contact with a tape 1 on which several passages are recorded. Output signals of the playback head 2 are introduced to a low-frequency amplifier 5 through an equalization amplifier 3 and a volume control 4, and then applied to a speaker 6 to form a normal playback network. Output signals of the equalization amplifier 3 are also applied to a recorded passage detection circuit 7, of which output signals are applied to a squelch circuit 8 and a motor control 9. An output terminal of the squelch circuit 8 is connected with the control terminal of the low-frequency amplifier 5, whereas the motor control 9 is connected with a motor 10 to control the revolution velocity of the motor 10 for driving the tape 1. The recorded passage detection circuit 7, the squelch circuit 8, and the motor control 9 in combination form a network of a recorded passage detection system 11 of the present invention.

The recorded passage detection circuit 7 comprises an automatic program advance switch 12. The recorded passage detection circuit 7 is ON and provides a recorded passage detection signal at the output terminal thereof upon depression of the automatic program advance switch 12 when the reproduction signal is applied from the equalization amplifier 3 to the recorded passage detection circuit 7. The recorded passage detection circuit 7 is OFF, so that it provides no recorded passage detection signal when the reproduction signal is not applied from the equalization amplifier 3 to the recorded passage detection circuit 7. Moreover, the recorded passage detection circuit 7 is ON upon depression of the automatic program advance switch 12 during providing of the reproduction signal from the equalizer amplifier 3 as discussed above, and then becomes OFF after a lapse of a predetermined time period when the providing of the reproduction signal from the equalization amplifier 3 is interrupted more than the predetermined time period. The squelch circuit 8 forces the low-frequency amplifier 5 into its cut-off state upon receiving the recorded passage detection signal from the recorded passage detection circuit 7. The motor 10 is constructed so that it can rotate at two different revolution velocities, namely, a normal playback speed and a fast forward or rewind speed. The motor control 9 controls the revolution velocity of the motor 10 in such a manner that the motor 10 rotates at its fast revolution velocity when the motor control 9 receives the recorded passage detection signal from the recorded passage detection circuit 7.

The operation mode of the automatic program head positioning system of the present invention will be described with reference to FIGS. 2(a) through 2(e).

The normal playback mode is as follows: The playback head 2 is in physical contact with the tape 1 on which several passages or programs are recorded, in order to reproduce signals recorded on the tape 1. The reproduced signals are amplified by the equalization amplifier 3, thereby obtaining the reproduction signal as shown in FIG. 2(a). The reproduction signal is applied to the low-frequency amplifier 5 via the volume control 4. The low-frequency amplified reproduction signal is applied to the speaker 6 from the low-frequency amplifier 5, thereby activating the speaker 6.

When the automatic program advance switch 12 is depressed at a time $t_1$ in order to skip the now reproduced program and go on to the next program, an advance switch signal as shown in FIG. 2(b) is applied to the recorded passage detection circuit 7. Since the reproduction signal is applied to the recorded passage detection circuit 7 from the equalization amplifier 3, the recorded passage detection circuit 7 provides the recorded passage detection signal shown in FIG. 2(c) during a time period from the time $t_1$ to the time $t_4$, where, the time period from $t_1$ to $t_3$ corresponds to the time period when the reproduction signal is applied to the recorded passage detection circuit 7, and the period $T_1$ from time $t_3$ to time $t_4$ corresponds to the predetermined time period after the interruption of the providing of the reproduction signal. The recorded passage detection signal is applied to the squelch circuit 8 and the motor control 9. The squelch circuit 8 provides a cut-off signal as shown in FIG. 2(d) to force the low-frequency amplifier 5 into its cut-off state during the time period from $t_1$ to $t_4$. The motor control 9 controls the motor 10 to rotate at its fast revolution speed during the time period beginning at the time $t_1$ and ending at the time $t_4$. In fact, the motor 10 begins to change its revolution speed at the time $t_1$ and rotates at the fast revolution speed during the time period from the time $t_2$ to the time $t_4$ and rotates at the normal playback speed after the time $t_5$, as shown in FIG. 2(e).

The low-frequency amplifier 5 returns its normal operation state, namely, ON state at the time $t_4$, whereas the notor 10 rotates at its normal playback speed after the time $t_5$. The following program or passage is reproduced from the speaker 6 after time $t_6$, thereby exactly skipping the passage which is about to be played and positioning the head at the following program.

A typical circuit construction of the recorded passage detection circuit 7 is shown in FIG. 3. An input terminal 15 of a limiter 16 is connected to receive the reproduction signal from the equalizer amplifier 3. An output terminal of the limiter 16 is connected with the positive electrode of a diode 17 and the negative electrode of another diode 18. The positive electrode of the diode 18 is grounded. The negative electrode of the diode 17 is connected with the base electrode of a transistor 20 and is grounded through a parallel circuit of a capacitor 21 and a resistor 22. The base electrode of the transistor 20 is connected with an output terminal 24, which provides the recorded passage detection signal, via a resistor 23. The collector of the transistor 20 is connected with a +Vcc power terminal 26 via resistor 25, and is also connected with the base electrode of a transistor 28 via a resistor 27. The emitter of the transistor 28 is connected with the +Vcc power terminal 26, whereas the collector of the transistor 28 is connected with the output terminal 24 through a light-emitting diode 29 and an SCR 30. The gate electrode of the SCR 30 is connected with the +Vcc power terminal 26 via a resistor 31 and the automatic program advance switch 12 and is also connected with the output terminal 24 via a resistor 32. The output terminal 24 is grounded via a resistor 33.

The operation mode of the recorded passage detection circuit 7 will be explained hereinbelow. The reproduction signal is applied to the input terminal 15 from the equalizer amplifier 3. The reproduction signal is pulse shaped by the limiter 16 to provide pulses of a predetermined amplitude, and then the pulses are rectified with voltage multiplication by the diodes 17, 18 to charge the capacitor 21. The charge on the capacitor 21 renders the transistor 20 ON and hence the transistor 28 is about to turn ON. Under these conditions, when the automatic program advance switch 12 is depressed, namely, ON, the SCR 30 is triggered to turn ON and, therefore, the electric current flows through tthe transistor 28, the light-emitting diode 29, the SCR 30 and the resistor 33. The output terminal 24 provides the recorded passage detection signal and the light emitting diode 29 indicates the operation state of the recorded passage detection circuit 7.

When the playback head 2 reaches a silent portion between recorded passages on the tape 1, the input terminal 15 does not receive the reproduction signal and, therefore, the charge on the capacitor 21 is discharged through the resistor 22. The transistor 20 is turned OFF after a lapse of the predetermined time period $T_1$ and hence the transistor 28 and the SCR 30 are turned OFF and, therefore, the output terminal 24 does not provide the recorded passage detection signal.

The capacitor 21 and the resistor 22 provide, in combination, a time constant circuit. The transistor 20 is maintained ON during the predetermined time period determined by the time constant after the interruption of the providing of the reproduction signal at the input terminal 15, whereby the transistor 20 can not be turned OFF when the playback head 2 reaches a silent portion within one recorded program, which period is shorter than the predetermined time period determined by the time constant circuit. The resistor 23 forms a positive feedback loop for the transistor 20, whereby a voltage level $V_o$ of the recorded passage detection signal at the output terminal 24 is maintained at either 0 volt or a predetermined voltage V without regard to variations of a voltage level $V_1$ of the reproduction signal applied to the input terminal 15. The voltage level of the recorded passage detection signal at the output terminal 24 may unavoidably vary in response to the variation of the voltage level of the reproduction signal applied to the input terminal 15, as is shown by the dotted line in FIG. 4, when the positive feedback loop is not provided.

A circuit construction of the motor control 9 is typically shown in FIG. 5. The time period $T_2$ from $t_4$ to $t_5$ (see FIG. 2) in which the revolution velocity of the motor 10 is changed from the fast one to the normal one must be reduced in order to place the program head at a precise position.

A servomotor circuit 69 can be of any conventional construction and comprises the motor 10, a generator 50, resistors 51, 52, 53, 54, 55 and 56, variable resistors 57 and 58, a coil 59, capacitors 60, 61, diodes 62, 63 and 64, transistors 65, 66 and 67, and a thermistor 68.

The collector of a transistor 71 is connected with the base electrode of the transistor 65 via a variable resistor 70 for adjusting the revolution velocity, whereas the emitter of the transistor 71 is grounded. The base electrode of the transistor 71 is connected with an input terminal 73 receiving the recorded passage detection signal from the recorded passage detection circuit 7. The servomotor circuit 69 is connected with a +Vcc power terminal 75 via a power switch 74. The emitter of a transistor 76 is connected with one terminal of the motor 10, and the collector of the transistor 76 is connected with the other terminal of the motor 10 for decelerating the motor 10. The base electrode of the transistor 76 is connected with the collector of a transistor 77 for releasing the deceleration of the motor 10. The base electrode of the transistor 77 is connected with the +Vcc power terminal 75 via a resistor 78 and the power switch 74 and is grounded via a capacitor 79, whereas the emitter of the transistor 77 is connected with the +Vcc power terminal 75 via a resistor 80 and the power switch 74 and is connected with the input terminal 73 via a capacitor 81.

A time constant circuit comprising the resistor 80 and the capacitor 81 determines an operation period $T_2$ of the transistor 76 for decelerating the motor 10. Another time constant circuit comprising the resistor 78 and the capacitor 79 determines an operation period of the transistor 77 for releasing the deceleration of the motor 10. The time constant determined by the resistor 78 and the capacitor 79 is selected so as to be longer than the time constant determined by the resistor 80 and the capacitor 81, whereby the operation period of the transistor 77 is selected so as to be longer than that of the transistor 76. The velocity adjusting variable resistor 70 adjusts the voltage level of the recorded passage detection signal from the recorded passage detection circuit 7, which is applied to the base electrode of the transistor 65, thereby controlling the operation point of the servo-control corresponding to the fast speed revolution of the motor 10. It will be clear from FIG. 6, showing the relationship between the supply voltage Vcc for the motor 10 (along the abscissa axis) and the magnification $n$ of the revoltuion velocity of the motor 10 in comparison with the normal playback speed (along the ordinate axis), that the motor 10 rotates at its normal playback speed when the velocity adjusting variable resistor 70 has the resistance value of ∞ even when the recorded passage detection signal is applied to the input terminal 73, whereas the motor 10 can not be servo-controlled when the resistance value of the variable resistor 70 is O.

The operation mode of the motor control 9 is as follows: The servomotor circuit 69 controls the revolution velocity of the motor 10 at its normal speed in such a manner as is well known in the art under the normal playback mode. When the recorded passage detection signal is applied to the input terminal 73 from the recorded passage detection circuit 7, the transistor 71 turns ON and hence the loop gain of the transistor 65 is reduced, whereby the motor 10 is controlled to rotate at its fast speed. The fast revolution velocity can be adjustable with the use of the velocity adjusting variable resistor 70. When the recorded passage detection signal from the recorded passage detection circuit 7 disappears, the transistor 71 turns OFF and hence the loop gain of the transistor 65 is returned to its normal value, whereby the motor 10 is controlled to rotate at its normal revolution velocity. At this instance, the transistor 76 is operated by the time constant circuit comprising the resistor 80 and the capacitor 81 in order to shunt the motor 10, thereby decelerating the revolution velocity of the motor 10 to promptly reach the normal playback velocity.

When the power switch 74 is turned ON to rotate the motor 10 at its normal playback velocity, the transistor 77 operates in such a manner as not to permit the operation of the transistor 76, thereby preventing the occurrence of the deceleration for the motor 10.

The invention being thus described, it will be obvious that the same way be varied in many ways. Such variations are not to be regarded as a departure from the spirit and scope of the invention, and all such modifications are intended to be included within the scope of the following claims.

What is claimed is:

1. An automatic program head positioning and tape feed control system for tape recording systems comprising:
    a playback head physically contacted with a tape;
    a motor for driving the tape and constructed so as to rotate, in response to differing electrical input at first and second revolution velocities which are different;
    a speaker;
    an equalization amplifier for providing a reproduction signal in response to a signal supplied from the playback head;
    a low-frequency amplifier for activating the speaker in response to the reproduction signal supplied from the equalization amplifier;
    an automatic program advance switch arranged so as to be in a normally open position and to be in the closed position upon depression thereof;
    a recorded passage detection circuit for generating a recorded passage detection signal upon depression of the automatic program advance switch during a time period when the reproduction signal is supplied from the equalization amplifier; and
    a motor control constructed so as to control the revolution of the motor at the first revolution velocity when it is supplied with the recorded passage detection signal from the recorded passage detection circuit and at the second revolution velocity when it is not supplied with said recorded passage detection signal.

2. The automatic head positioning and tape feed control system for the tape recording system of claim 1, wherein the first revolution velocity of the motor is a fast revolution velocity corresponding to a fast forward movement of the tape recording system, and the second revolution velocity of the motor corresponds to a normal playback speed of the tape recording system.

3. The automatic program head positioning and tape feed control system for the tape recording system of claim 1, wherein the generation of the recorded passage detection signal by the recorded passage detection circuit is terminated when the supplying of the reproduction signal from the equalization amplifier to said recorded passage detection circuit is interrupted for more than a predetermined time period.

4. The automatic program head positioning and tape feed control system for the tape recording system of claim 1, further comprising a squelch circuit constructed to force the low-frequency amplifier into its cut-off state during the time period when the recorded passage detection signal is supplied by the recorded passage detection circuit to said squelch circuit.

5. The automatic program head positioning and tape feed control system for the tape recording system of claim 1, wherein the motor control comprises a servomotor circuit, a first transistor arranged for decelerating the motor by shunting action across said motor, a first time constant circuit for determining an operation period of the first transistor, a second transistor for releasing the deceleration of the motor, and a second time constant circuit for determining an operation period of the second transistor, said second transistor being arranged to release deceleration of the motor by blocking operation of the first transistor.

6. The automatic program head positioning and tape feed control system for the tape recording system of claim 5, wherein the first transistor is operated by the first time constant circuit upon termination of the generation of the recorded passage detection signal by the recorded passage detection circuit.

7. The automatic program head positioning and tape control system for the tape recording system of claim 5, further comprising a power switch for connecting the motor control with a power source, wherein the second transistor is operated by the second time constant circuit upon the closing of the power switch.

8. The automatic program head positioning and tape feed control system for the tape recording system of claim 5 wherein a time period determined by the second time constant circuit is longer than a time period determined by the first time constant circuit.

* * * * *